May 23, 1967         W. A. POZNIK         3,321,663
CONTROL SYSTEM FOR MOTOR VEHICLES
Filed March 10, 1964
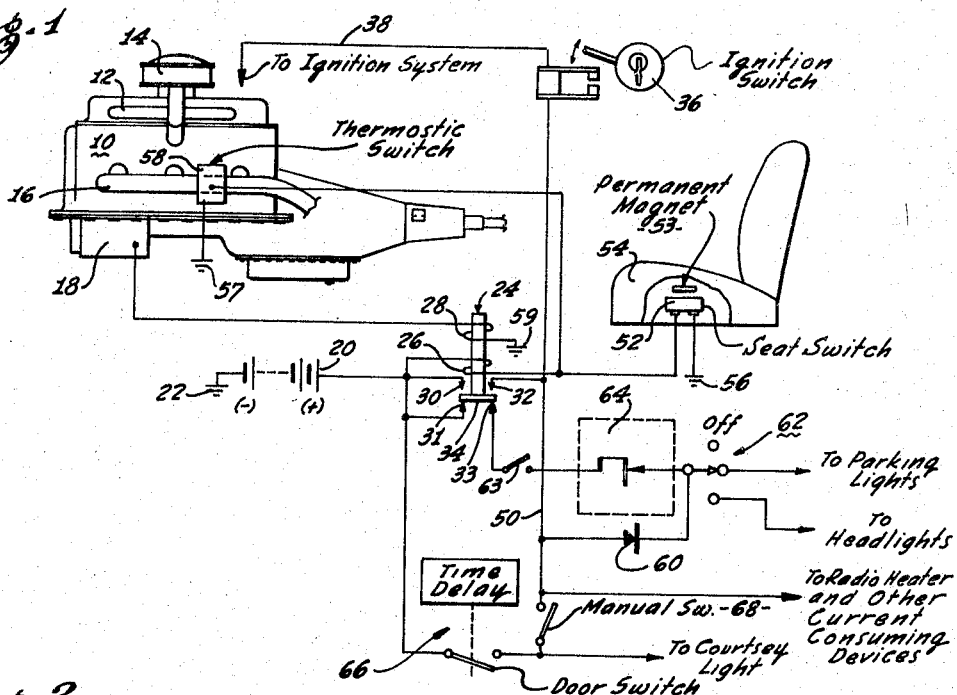
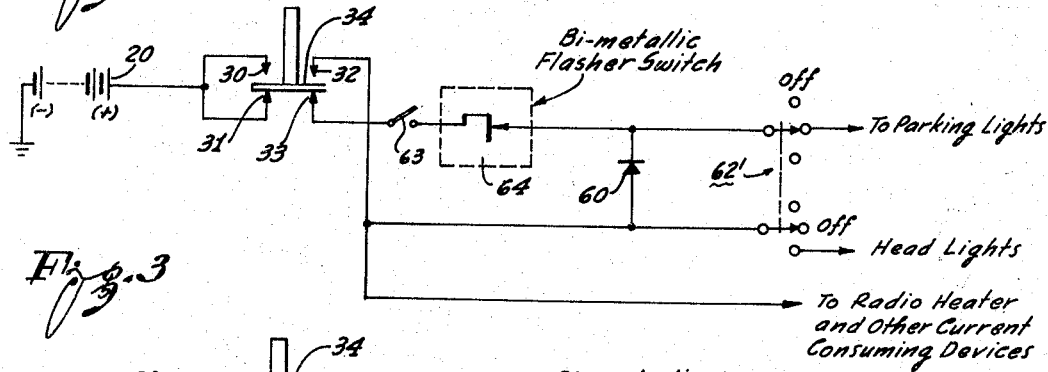
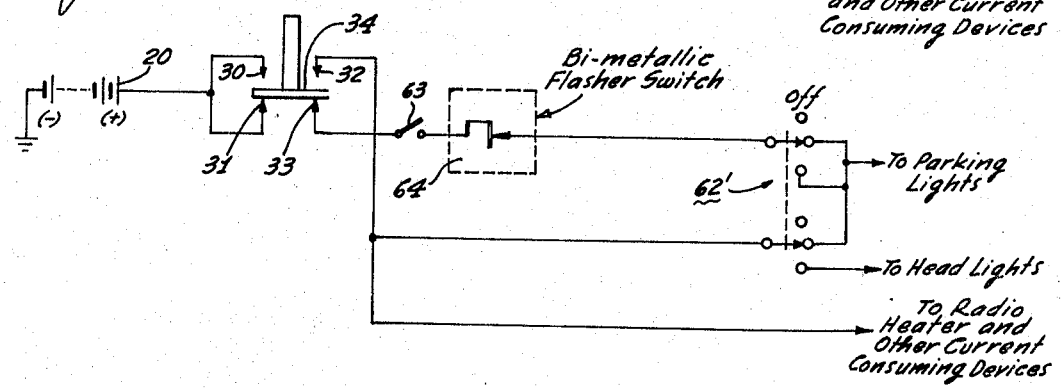
INVENTOR:
William A. Poznik
By Keith D. Beecher
Attorney

United States Patent Office 3,321,663
Patented May 23, 1967

3,321,663
CONTROL SYSTEM FOR MOTOR VEHICLES
William A. Poznik, 1710 Harper Ave.,
Redondo Beach, Calif. 90278
Filed Mar. 10, 1964, Ser. No. 350,733
3 Claims. (Cl. 315—82)

The present invention relates to electrical control systems for motor vehicles, or the like; and it relates more particularly to an improved electrical control system for automatically turning off, or otherwise controlling the electrical loads in a motor vehicle when the driver has left the vehicle.

The system to be described herein is of the same general type as described in Patent 2,806,150, which issued Sept. 10, 1957, to William Poznik.

As mentioned in the aforesaid patent, it is possible in most present day automobiles for the driver to leave the vehicle, and to forget to turn off the headlights of the vehicle and/or other electrical current consuming devices. Such an inadvertence can produce a severe drain on the battery of the vehicle, so that when the driver returns to the vehicle he may be unable to start it due to the low state of charge in the battery.

It is common practice today for homes and other buildings to be equipped with a main, master switch circuit. Moreover, Civil Air Regulations requires that aircraft be equipped with a master switch; so as to provide a simple means to assure that all circuits are turned off before the crew leaves the aircraft.

A prime object of the present invention is to provide a master switch assembly for automobiles, where the need is just as valid as in homes or aircraft, and to provide automatic control means for such an assembly.

Although control systems have been proposed in the past for use in a motor vehicle to turn off the headlights automatically when they have been inadvertently left on, such control systems for the most part have been unduly complicated and difficult to install. In addition, the operation of many types of such prior art control systems has proven to be unreliable and limited, and the prior art control systems have exhibited tendencies to turn off the headlights and other accessories at times when no control is desired.

The improved automatic control system described in the aforesaid patent is so conceived that it operates only when wanted. That system, for example, serves to turn off all the current consuming devices of the automobile when the engine temperature drops below a selected threshold, and when the driver has left the vehicle.

The control system described in the patent operates in a manner such that if a person parks his car and leaves it, even with the ignition switch on, the control system will automatically take over after the engine cools down and turn off all the current consuming devices in the vehicle, including the ignition system. It is possible and desirable, of course, to bypass the aforesaid control system, insofar as certain of the accessory electrical devices in the vehicle are concerned. These devices may include, for example, the electric clock, the parking lights, and other selected devices.

As mentioned above, the control system described in the aforesaid patent is conceived so that, so long as the driver is in the driving seat of the motor vehicle, the automatic control system will not perform its control function. That is, the described control system in the patent operates only when it is needed, and does not become a nuisance by operating at inappropriate times.

As mentioned above, it is sometimes inadvisable to include the parking lights of the vehicle in the control of the aforesaid automatic control system. This is because it is sometimes desirable, and sometimes required by law, that the parking lights be left on when the vehicle is unattended. Some states, in the interest of safety, have passed legislation requiring the use of flashing warning signals when a car is stopped along the highway. The improved system of the present invention, however, provides for an automatic control of the parking lights, in addition to the other controlled instrumentalities. This latter control, in the embodiment to be described, is one by which the parking lights flash on and off when under the control of the automatic control system to be described herein. The same control can be extended to the headlights, if so desired, as will be described.

The control effect mentioned immediately above, whereby the parking lights of the motor vehicle flash on and off when the control effect takes hold, produces a positive indication that the motor vehicle is unattended and constitutes a possible road hazard. That is, the flashing parking lights produce a positive means of drawing attention to themselves. In addition, the current drain of the flashing parking lights in considerably less than the drain on the battery when they are left on continuously.

As mentioned above, and as will be described, the flashing effect of the control system of the present invention can be exerted on the parking lights, or on the headlights independently, or on both the parking and the headlights if so desired. Under normal conditions, the control should be such that the headlights are automatically turned off (should they inadvertently or purposely be left on), and only the parking lights should come under the flashing control of the control system of the present invention. This is due to the fact that the headlights exert a relatively high drain on the battery when in their flashing condition, and also because the flashing headlights themselves could produce a hazardous road situation.

Many motor cars are provided with lights which are under the control of the doors, and which are energized when a door of the vehicle is opened. These lights are commonly known as "courtesy" lights. In accordance with a further feature of the invention, the improved control system to be described provides a control for the courtesy lights. This control is such that the courtesy lights remain on for a short interval only, when a door of the vehicle is first opened, and then the control system of the invention acts automatically to turn off the courtesy lights. This automatic control of the courtesy lights assures that, even though they remain energized for a sufficient time to permit a person to enter or leave the vehicle, they will become extinguished automatically should a door of the vehicle be left open for a prolonged interval of time. In this manner, excessive drain on the battery of the motor vehicle is prevented.

Another feature of the improved control system of the invention is the provision of a magnet operated switch in the driver's seat of the vehicle, together with a permanent magnet which is embedded in the foamed elastomer upholstery of the usual car seat. Only when the driver is sitting in position in the driver's seat is the permanent magnet brought near enough to the magnet operated switch to actuate the switch. This construction provides a satisfactory and reliable switching assembly for use in the control system to be described.

An object of the present invention, therefore, is to provide an improved automatic control system for use in a motor vehicle for automatically turning off, or otherwise controlling, the current consuming devices in the vehicle which have inadvertently or purposely been left on.

Another object of the invention is to provide such an improved control system which exerts a relatively wide range of controls on the aforesaid current consuming devices.

Yet another object of the invention is to provide such an improved control system which is relatively inexpensive to construct and relatively simple to install.

Other objects and advantages of the invention will become apparent from a consideration of the accompanying drawing, in which:

FIGURE 1 shows one embodiment of the improved control system of the present invention and which includes means for exerting a flashing control on the parking lights or headlights of the vehicle, and which also exerts a control on the courtesy lights thereof;

FIGURE 2 is a fragmentary circuit showing a modification to a portion of the control system of FIGURE 1, whereby only the parking lights are controlled in a flashing manner by the control system; and FIGURE 3 is a further fragmentary circuit showing a further modification of the system of FIGURE 1, whereby provisions are made to cause the parking lights to be set to a blinking condition, even though the vehicle is left with the headlights inadvertently on, the control system functioning to turn the headlights themselves off.

Referring now to FIGURE 1, there is illustrated therein an internal combustion engine such as used in most automobiles, and this is indicated generally as 10. The engine 10 is provided with a usual intake manifold 12, and the manifold is coupled to the carburetor 14. The engine 10 also includes an exhaust manifold 16 and an electric current alternator 18.

The illustrated engine, of course, is merely a schematic representation. The representation is intended to indicate the internal combustion engine of a typical motor vehicle, and also to show several of the well-known components which are associated with the engine.

The vehicle also includes a battery 20 which is the usual storage battery. One terminal of the battery 20 is connected to the frame of the motor car so as to constitute the common connection of the electrical system. This common connection is indicated as a ground connection 22.

The embodiment shown in FIGURE 1 includes a solenoid switch 24 of usual and known construction. This switch includes a first actuating winding 26 and a second actuating winding 28. The switch also includes a pair of normally-open contacts 30 and 32, and it includes a pair of normally-closed contacts 31 and 33. These contacts 30, 32 and 31, 33 are opened and closed respectively by an armature 34 whenever either the solenoid winding 26, or the solenoid winding 28, or both, are energized.

The normally-open solenoid contacts 30 and 32 are connected in circuit between the ungrounded terminal of the battery 20 and one terminal of a usual key-operated ignition switch 36. The other terminal of the ignition switch 36 is connected to the ignition circuit of the engine (not shown). This latter connection is made by means of a lead 38.

The normally-open contacts 30 and 32 of the solenoid switch 24 are also connected in circuit with the ungrounded terminal of the battery 20 and through a blocking diode 60 to the armature of a switch 62. The normally open contacts 30 and 32 of the solenoid switch are also connected between the ungrounded terminal of the battery 20 and a lead 50. The lead 50 is connected to other current consuming devices of the vehicle, such as the radio, heater, and other accessories.

The normally-closed contacts 31 and 33 are connected between the ungrounded terminal of the battery 20 and a manually operated switch 63. The switch 63 is connected in series with a bi-metallic switch 64. The bi-metallic switch 64 is of usual construction, and functions in a manner such that when a current is passed through the switch, it is alternately actuated between an "on" and an "off" condition at regular intervals. The switch 64 is also connected to the armature of a switch 62. The switch 62 is the normal headlight switch of the vehicle. It has one terminal connected to the parking lights, a second terminal connected to the headlights, and a third open terminal representing an "off" condition.

It is apparent from the preceding description that so long as the solenoid contacts 30 and 32 are closed, a circuit is established to the manually operated switch 62, so that the headlights, or parking lights, can be turned on and off for normal operation. In addition, an energizing circuit over the lead 50 to the additional current consuming devices is established so long as the normally-open solenoid contacts 30 and 32 are closed, as is a connection from the battery 20 to the ignition switch 36, so that the ignition system of the vehicle can be energized.

In other words, so long as the solenoid switch 24 is energized, and the contacts 30 and 32 are closed, the electrical system of the motor car may be operated in a normal manner.

The illustrated embodiment of the control system also includes a magnetic reed switch 52 which is mounted under the driver's seat 54 of the vehicle, and which constitutes a magnet operated switch. A permanent magnet 53 is also embedded in the driver's seat. Whenever the driver sits in the driver's seat, the permanent magnet 53 is brought into the vicinity of the magnet operated switch 52, so that the switch 52 is actuated. When the switch is actuated, it closes its electrical contacts. One of the electric contacts of the switch 52 is grounded, and the other is connected through the energizing winding 26 of the solenoid switch 24 to the ungrounded terminal of the battery 20.

Current automative seat designs make extensive use of foamed elastomers for seat cushions. Usually these seats are constructed to meet the demands of low automobile profiles. This means that the installation of a satisfactory switch for the control system is difficult with switches of usual construction.

The magnet operated switch 52 and associated permanent magnet described above permits a practical switch installation at low cost and with a high degree of reliability. As noted above, the switch 52 may be reed type switch which is constructed to be actuated by a permanent magnet. The switch 52 and the permanent magnet 53 are positioned within the foamed elastomer seat in such a manner that in a free condition (with nobody seated in the seat), the magnet is displaced from the switch by such a distance that it has no effect on the switch.

However, when a person seats himself on the seat cushion and compresses the foamed elastomer, the permanent magnet 53 is brought into a closer position with the switch 52, so that it may actuate the switch. The switch assembly can be made as a plug which may be inserted into the seat from below. The physical size of currently available magnets, and magnetically operated reed switches permits the construction of plug-type switch assemblies of no larger than one and one-half inches in diameter and one inch in height. These small plug type switch assemblies may be suspended within the foamed elastomer of the seat cushion, and cannot normally be felt or sensed by any person seated on the cushion. Moreover, such reed switches have been available for some time and are extremely reliable.

Further in accordance with the system described in the aforesaid patent, a thermostatic switch unit 58 of known construction is mounted with its control element in the immediate vicinity of the internal combustion engine 10. An appropriate mounting position for the switch 58 is on the exhaust manifold 16 of the engine. The exhaust manifold portion of the engine heats up rapidly when the engine is placed in an operating condition. It therefore provides the desired control for the switch 58.

As shown, the thermostatic switch unit 58 is connected in shunt with the magnet operated switch 52 in the driver's seat. That is, one terminal of the thermostatic switch 58 is connected to the frame of the vehicle, or ground, as at 57; and the other terminal is connected through the winding 26 of the solenoid switch 24 to the ungrounded terminal of the battery 20.

The alternator 18 associated with the engine 10 has its ungrounded terminal connected through the energizing winding 28 of the solenoid switch 24 to the frame of the vehicle, or ground, as at 59. Whenever the engine 10 is running, the alternator 18 generates a voltage, and this voltage produces an energizing current in the winding 28 of the solenoid switch 24. Therefore, the solenoid contacts 30 and 32 are closed when the engine is running, and the contacts 31 and 33 are open. The solenoid switch 24 is made sensitive enough so as to operate even at the voltage normally produced by the alternator 18 during the idling condition of the engine.

Whenever a person is in the driver's seat 54, the magnet operated switch 52 is closed due to the action described above, so that the winding 26 of the solenoid switch 24 is energized. This causes the armature 34 to close the solenoid contacts 30 and 32, and to open the solenoid contacts 31 and 33. When the contacts 30 and 32 close, the electrical system of the vehicle may be operated in normal manner. Now, should the driver turn on the ignition switch and start the engine 10, the alternator 18 will energize the winding 28 of the solenoid switch 24; so as to maintain the switch contacts 30 and 32 closed, and the contacts 31 and 33 opened.

It is evident that the driver can leave the automobile, so long as the engine is running, without the control system of the invention being effective.

After a very brief running time, the exhaust manifold 16 of the engine 10 warms up and the heat developed by it exceeds the selected threshold to close the thermostatic switch 58. The closure of the thermostatic switch 58 energizes the winding 26 of the solenoid switch, so that the contacts 30 and 32 are held closed, and the contacts 31 and 33 are held open, regardless of whether the engine is running and regardless of whether or not the driver is in the driver's seat.

Therefore, the driver is now free to turn off the engine and leave the vehicle, and still the control system to be described will not function until a predetermined time interval has elapsed. That is, until the engine has cooled down sufficiently to cause the thermostatic switch 58 to operate. This latter time interval may, for example, be of the order of ten to thirty minutes, with usual present-day thermostatic switches, depending upon the aforementioned adjustment.

Should the driver leave the automobile, and inadvertently or purposely leave several or all of the current consuming devices energized, including even the ignition system; then, after the predetermined interval has elapsed, the above-described control system will operate.

In a manner described in the aforesaid patent, the operation of the control system causes the cantacts 30 and 32 to open, so as to break the battery connection to the ignition switch 36, and to the radio, heater, and other current consuming devices of the vehicle.

In accordance with the concepts of the present invention, the operation of the control system also causes the contacts 31 and 33 to close. Then, unless the operator has previously opened the switch 63, this places the bi-metallic switch 64 in the circuit. Now, under these conditions, should the switch 62 be previously actuated so as to cause the parking lights normally to be illuminated through the blocking diode 60, this latter action causes the bi-metallic switch 64 to be placed in the circuit, instead of the diode 60, so that the parking lights are caused to flash after the control system has been activated. Likewise, should the switch 62 previously be placed in position to illuminate the headlights, the aforementioned action causes the headlights to flash. However, if the switch 63 is left open, there is no flashing operation. Instead, after the prescribed period, the headlights and parking lights are extinguished by the opening of the contacts 30 and 32.

As mentioned above, it is sometimes desirable to provide an independent circuit to the door-operated courtesy lights of the vehicle. In the embodiment of FIGURE 1, this independent circuit is provided through a time delay switch 66. This time delay switch may be of the usual dash pot construction, or thermal breaker type of switch; or any other suitable known switch which when closed, will open automatically a predetermined time interval after such closure.

The manual operation of the courtesy lights is provided by means of a manually operated switch 68. This latter switch is energized through the normally-open contacts 30 and 32 of the solenoid switch 24. Therefore, if the manual switch 68 is inadvertently left closed, the courtesy lights will be extinguished after the predetermined interval, and upon the operation of the control system. At other times, and even though the control system of the solenoid switch 24 has operated, the courtesy lights still will become energized for a short time when the door is opened and under the control of the time delay switch 66.

As mentioned above, under some circumstances, a flashing control of the headlights may be undesirable. The circuit of FIGURE 2 is essentially similar to the corresponding portion of the system of FIGURE 1, and like elements have been designated by the same numbers.

In the modification to the system, as represented by the circuit of FIGURE 2, the flashing control of the bi-metal switch 64 is provided only for the parking lights, and the headlights are under the normal control of the control system. To this end, the light switch 62 is replaced by a double pole switch 62'. The switch 62' has a first armature which connects the bi-metal switch 64 and diode 60 selectively to the parking lights in a central position, and to an "off" condition for the two switch positions on either side of the central parking light position. The switch 62' also has a second armature which serves to energize the headlights in the extreme lower position; and the second armature has two other positions, which both represent an "off" condition.

It is evident that when the armatures of the switch 62' are set to the illustrated central position, only the parking lights are energized, and these come under the flashing control of the flasher switch 64 when the control system operates. Alternatively, when the armatures of the switch 62' are set to the lower position, only the headlights are energized, and these come under the on-off control of the control system itself.

The embodiment represented by the circuit of FIGURE 3 is also generally similar to the corresponding portion of the system of FIGURE 1, and, again, like components have been designated by the same numbers. In the latter embodiment, if the headlights are left on, then the system functions automatically to transfer a connection to the parking lights, so that the parking lights will flash, when the control sysem is activated.

For the above-mentioned purpose, the two lower terminals of the upper portion of the switch 62' are connected together and to the parking lights, and the central terminal of the lower portion of the switch 62' is also connected to the parking lights. The lower terminal of the upper portion of the switch 62' is connected to the headlights.

Therefore, if the armatures of the switch 62' are in the position shown, whereby the parking lights are energized, the circuit operates in a manner similar to the circuit of FIGURE 2, so that the parking lights are brought under a flashing control by the switch 64, after the control system has operated.

Moreover, if the armatures of the switch 62' in the circuit of FIGURE 3 are moved so that they connect with the respective lower terminals, so as to energize the headlights, the parking lights are normally de-activated, because the contacts 31 and 33 of the solenoid switch 34 are normally open. However, if the headlights are left on, and the control system described above operates, the opening of the contacts 30 and 32 of the solenoid switch 34 cause the headlights to be de-energized.

However, when the switch 62′ is in the aforesaid lower position to energize the headlights, the upper armature connects with the parking lights. Therefore, when the solenoid switch contacts 31 and 33 close due to the operation of the control system, the parking lights are again brought under the flashing control of the flasher switch 64.

The invention provides, therefore, an improved system for automatically controlling the various electrical accessories of an automobile, should these accessories be inadvertently or purposely left on when the car is parked. As mentioned above, the control system of the present invention is of the same general type as that described in Patent 2,806,150. However, the control system described herein incorporates certain additional features which include, for example, a flashing control of the parking lights and/or headlights, and other specifically described improvements.

It will be appreciated, of course, that other control circuit means for controlling the solenoid switch 34 may be utilized. For example, several equivalent control systems are disclosed in the aforesaid patent, and other systems may also be used.

Therefore, although certain embodiments of the invention have been shown and described, it will be appreciated that the invention is susceptible to changes in form and detail, within the scope of the following claims.

What is claimed is:

1. An electrical control system for controlling the connection between a source of electrical energy and the parking lights and headlights of a motor vehicle, including: relay means having a pair of normally-closed contacts and a pair of normally-open contacts; an automatically operated control circuit connected to said relay means for selectively activating said relay means; a flasher switch unit; a manually operated multi-pole switch; a first circuit connecting said source, said normally-closed contacts of said relay means and said flasher unit in circuit with said manually operated switch; a second circuit connecting said source and said normally-open contacts of said relay means in circuit with said manually operated switch; and further circuitry connecting said manually operated switch to said headlights and said parking lights to permit said manually operated switch selectively to switch said parking lights between an "off" position and at least one "on" position during which said parking lights are connected to said first circuit, and simultaneously to permit said manually operated switch selectively to switch said headlights and parking lights between an "off" position and a first "on" position during which said parking lights are connected to said second circuit and a second "on" position during which said headlights are connected to said second circuit.

2. The control system defined in claim 1 in which said control circuit includes a magnetically operated switch embedded in the driver's seat of the vehicle, and magnet means embedded in said seat to be brought into actuating relationship with said switch when said seat is occupied.

3. The control system defined in claim 1 in which said vehicle includes door-controlled courtesy lights, and in which said control system includes a time delay switch connecting such lights to said source for causing said courtesy lights to be energized only for a selected time interval when a door of said vehicle is opened.

References Cited by the Examiner

UNITED STATES PATENTS

| | | | |
|---|---|---|---|
| 2,497,792 | 2/1950 | Poznik | 307—10 |
| 2,669,664 | 2/1954 | Poznik | 307—10 |
| 2,758,218 | 8/1956 | Poznik | 307—10 |
| 2,787,779 | 4/1957 | Hollins | 340—81 |
| 2,802,142 | 8/1957 | Johnson | 307—10 X |
| 2,806,150 | 9/1957 | Poznik | 307—10 |
| 2,851,673 | 9/1958 | Hollins | 340—81 |
| 2,877,361 | 3/1959 | Chase | 340—274 |
| 3,074,049 | 1/1963 | Saliba | 340—81 X |
| 3,104,289 | 9/1963 | Segel | 200—87 |
| 3,221,211 | 11/1965 | Murphy | 315—84 |

ORIS L. RADER, *Primary Examiner.*

T. J. MADDEN, *Assistant Examiner.*